H. & J. OLDENDORPH.
Gang-Plows.

No. 150,702.

2 Sheets--Sheet 1.

Patented May 12, 1874.

Witnesses.
Chas. F. Meisner.
J. W. Herthel.

Inventor.
Henry Oldendorph and
John Oldendorph
per Herthel & Co
Attys.

2 Sheets--Sheet 2.
H. & J. OLDENDORPH.
Gang-Plows.
No. 150,702.
Patented May 12, 1874.
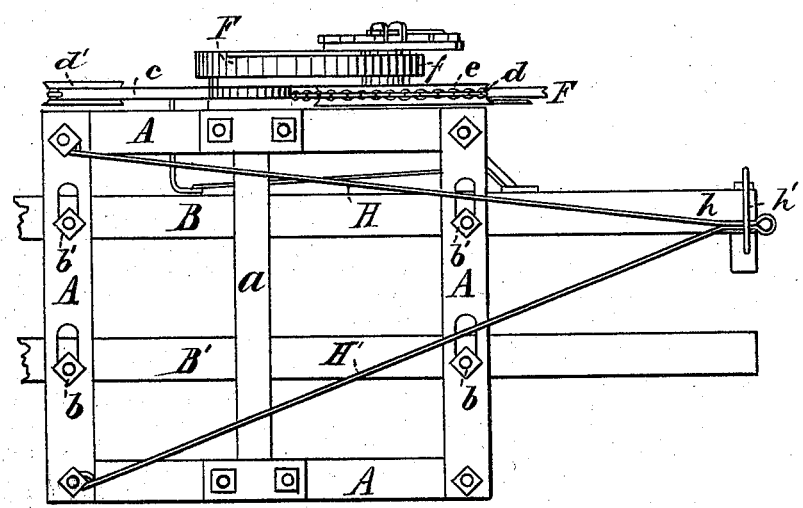
fig. 4.
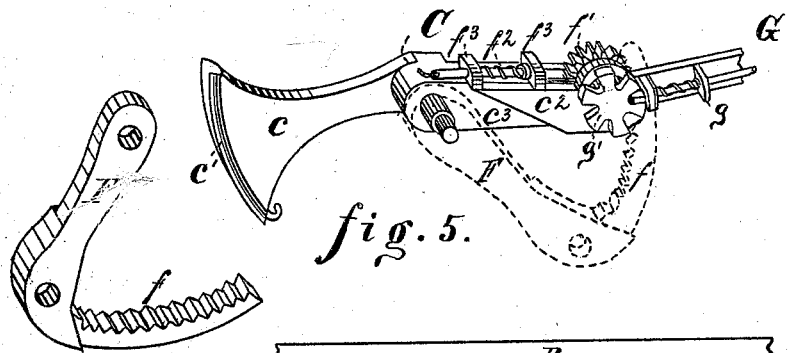
fig. 5.
fig. 6.
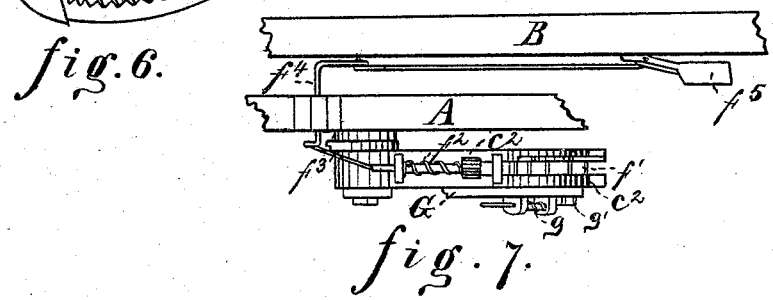
fig. 7.
Witnesses.
J. W. Herthel.
Chas. F. Meisner.
Inventor.
Henry Oldendorph & John Oldendorph
per Herthel & Co
attys.

UNITED STATES PATENT OFFICE.

HENRY OLDENDORPH AND JOHN OLDENDORPH, OF MILLSTADT, ILLINOIS.

IMPROVEMENT IN GANG-PLOWS.

Specification forming part of Letters Patent No. 150,702, dated May 12, 1874; application filed February 26, 1874.

*To all whom it may concern:*

Be it known that we, HENRY and JOHN OLDENDORPH, both of Millstadt, St. Clair county and State of Illinois, have invented an Improved Gang-Plow, of which the following is a specification:

This invention relates to the peculiar combination of devices by means whereof the plows can be gaged to any proper depth, as well as to the combination of parts which suit the action of the plows to the varying condition of the soil.

Figure 1:
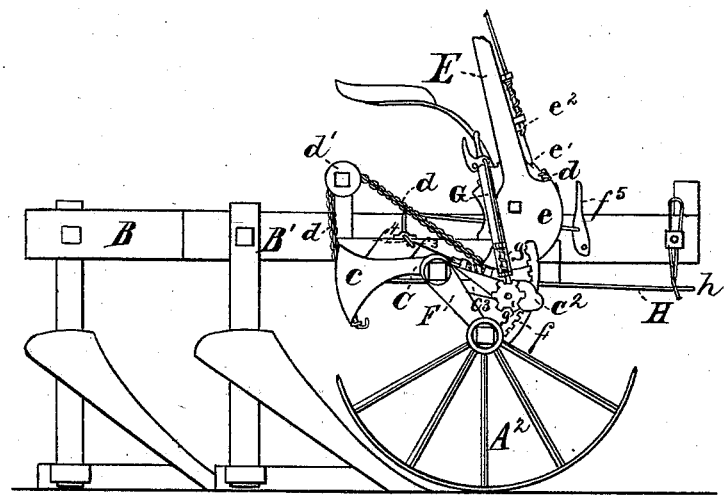
Figure 2:
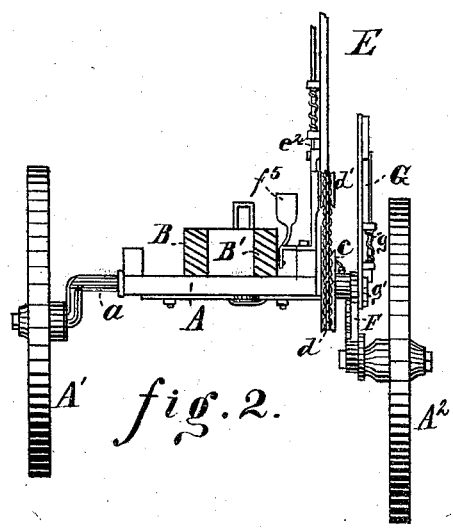
Figure 3:
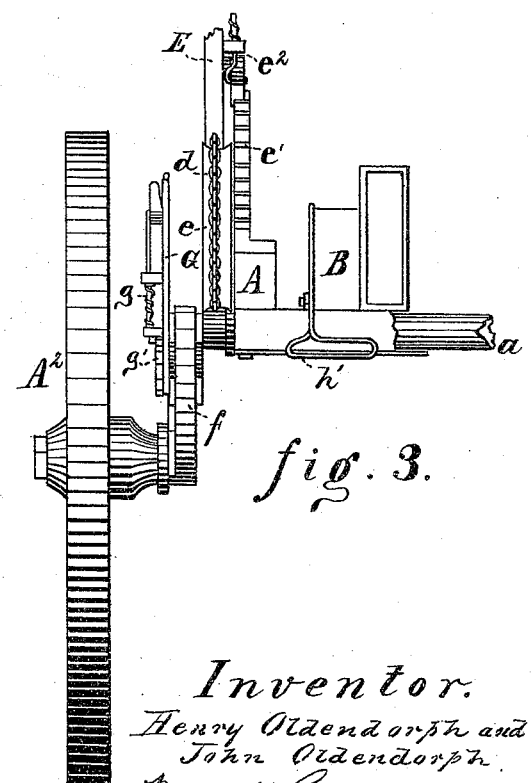

Of the drawing, Sheet 1, Figure 1 is a side elevation; Fig. 2, a rear elevation, without plows; Fig. 3, an enlarged front elevation. Sheet 2, Fig. 4 is a bottom plan of plow-frame and draft attachment. Fig. 5 is a perspective view of compound lever, showing the pivoted axle-arm, with its rack in dotted lines. Fig. 6 is a perspective view of pivoted axle-arm and its rack, Fig. 7 being a detail plan view of foot-treadle connection to gearing attachment.

A, Fig. 4, is the plow-frame, in proper bearings of which is the shaft $a$. The shaft $a$ is a crank-shaft, to one end of which the wheel $A^1$ is attached. (See Fig. 2.) B B' are the plow-beams, carrying the plows, as usual. Bolts at $b\ b'$, Fig. 4, passing through the plow-beams, secure the same to the top of the frame A, said bolts passing through slots in said frame, so that the plow-beams can be adjusted laterally. It is, therefore, only necessary to loosen the bolts $b\ b'$ and adjust the plow-beams to one side or the other, as required, in order to position and secure the plows so as to take more or less land. To the opposite end of the shaft $a$ we firmly secure a compound lever, C. This is of the constructive shape shown in Figs. 1 and 5. The compound lever C is formed or cast in one piece, and consists of the curve-shaped arm $c$, having a groove, $c^1$, and branch arm $c^2$, having the offset $c^3$, with a slotted bearing at its end, as indicated in Fig. 5. The broad curve-shaped arm $c$ affords greater leverage, and its groove $c^1$ is for the passage of a chain, $d$, one end of which is attached to said arm, the other end of chain passing over a groove-pulley, $d'$, which has its standard bolted to frame A. (See Figs. 1 and 2.) From the pulley $d'$ the chain $d$ passes round the groove in lower part of hand-lever E to its point of attachment to same. (See Figs. 1 and 3.) The lower part of hand-lever E at $e$ is curved, (see Fig. 1,) so as to afford the greatest leverage to act upon the chain $d$. The hand-lever E is pivoted alongside of a ratchet-plate, $e^1$, which is properly bolted to frame A. (See Figs. 1 and 3.) Engaging the ratchet $e^1$ is a spring-pawl catch, $e^2$, with which the hand-lever E is provided. (See Figs. 1, 2, and 3.) By therefore disengaging the spring-pawl catch $e^2$ from its ratchet $e^1$, and raising or lowering the hand-lever E by means of its chain $d$, the curved branch arm $c$ (of compound lever C) is operated to raise or lower the plow-frame, and at the same time raise or lower the plows. Thus the plows can be increased or diminished in depth, or gaged in the furrow as regards the depth required.

It is essential to suit the action of the wheels to the varying condition of the soil, in order to retain the plows in proper gaged position. This we accomplish by the devices that raise or lower the wheels in accordance with the low or hilly soil. Hence we attach alongside of the compound lever C, in its offset $c^2$, and firmly to end of the shaft $a$, a pivoted axle-arm, F. (See Fig. 1.) The pivoted axle-arm F consists of the arm F proper, and forming part thereof is a segmental rack, $f$, as clearly shown in Fig. 6. The object of the arm F is to act as a similar crank to the shaft $a$ at its end, as the crank of said shaft at its opposite end. (See Fig. 2.) In the pivoted axle-arm F a suitable sub-axle turns, which supports the wheel $A^2$. (See Figs. 1, 2, 3.) The object of the segmental rack $f$ is to pass and engage a pinion, $f^1$, which is in the branch arm $c^2$ of compound lever C, operating in its slotted end thereof. (See Figs. 5 and 7.) Engaging the pinion $f^1$ is a spring-pawl catch, $f^2$, the rod of which operates in proper bearings $f^3$, top of the branch arm $c^2$. (See Figs. 1, 5, and 7.) To one end of the spring-pawl $f^2$ is a chain, $f^3$, which connects with one end of a crank-shaft, $f^4$, of the frame A. The other end of said shaft $f^4$ connects by chain to a foot-treadle, $f^5$, pivoted to one side of the plow-beam. (See Fig. 7.) The operator, by operating the foot-treadle $f^5$, can therefore cause the spring-pawl $f^2$ to engage or disengage the pinion $f^1$. In order, however, to raise or lower the compound lever C, so as to vary the height of the axle $a$, we further pivot alongside of its branch arm $c^2$ a hand-lever, G. This hand-lever is similarly provided with a spring-pawl lever, $g$, fitted to engage a lock-plate, $g'$. (Shown in Fig. 1.) The lock-plate $g'$, bearing of hand-lever G, and pinion $f^1$ are secured by the same pivot-pin passing through the branch arm $c^2$ of the part C. The hand-lever G, when therefore actuated to turn the pinion $f^1$, causes the segmental rack $f$ (of the arm F) to travel said pinion, and in doing so the said arm F is raised or lowered, and consequently the position of the plow-frame parts relatively maintained in raised or lowered position. It is, therefore, simply required that the operator actuate the foot-treadle to disengage the spring-pawl lever $f^2$, which leaves the pinion free to be operated by the hand-lever G, which the operator at the same time adjusts, so as to raise or lower the pivoted axle-arm F, and adapt thus the passage of the wheels to the requirements of the soil, and maintain the same gage of action for the plows.

Our draft attachment consists of draft-rods H H', one end of each being secured to the extreme rear ends bottom of plow-frame A, the other ends of said draft-rods being made to converge to a point at $h$, as shown in Fig. 4. The forward ends $h$ of the draft-rods are supported by a device, $h'$, which is adjustably secured to one side of the plow-beam, next to the furrow. (See Figs. 3 and 4.)

The object of securing the draft-rods H H' to the rear of the plow-frame is the better to bring the draft as near as possible to the resistance offered by the plows, and the object of securing the draft at the point $h$, as shown, being to equalize the draft when two or more animals are used.

What we claim is—

1. The pivoted axle-arm F, provided with rack-bar $f$, forming part of said arm, as and for the purpose set forth.

2. The combination of the pivoted axle-arm F, its rack $f$, pinion $f^1$, with compound lever C, having branch arms $c\, c^2$, as and for the purpose set forth.

3. The combination of the foot-treadle $f^5$, crank-shaft $f^4$, chain $f^3$, spring-pawl lever $f^2$, pinion $f^1$, compound lever C, hand-lever G, lock-plate $g'$, pivoted axle-arm F, with rack $f$, to operate as and for the purpose set forth.

4. The combination of compound lever C, consisting of branch arms $c\, c^2$, chain $d$, pulley $d'$, hand-lever E, its spring-pawl lever $e^2$, ratchet-plate $e^1$, all constructed to operate as and for the purpose set forth.

In testimony of said invention we have hereunto set our hands in presence of witnesses.

HENRY OLDENDORPH.
JOHN OLDENDORPH.

Witnesses:
WILLIAM W. HERTHEL,
CHAS. F. MEISNER..